(12) United States Patent
Badt, Jr. et al.

(10) Patent No.: US 7,934,230 B2
(45) Date of Patent: Apr. 26, 2011

(54) IPTV ARCHITECTURE FOR DYNAMIC COMMERCIAL INSERTION

(75) Inventors: Sig Badt, Jr., Richardson, TX (US); Chao Kan, Frisco, TX (US)

(73) Assignee: Alcatel Lucent, Paris (FR)

( * ) Notice: Subject to any disclaimer, the term of this patent is extended or adjusted under 35 U.S.C. 154(b) by 780 days.

(21) Appl. No.: 11/800,279

(22) Filed: May 4, 2007

(65) Prior Publication Data
US 2008/0276267 A1 Nov. 6, 2008

(51) Int. Cl.
*H04N 7/025* (2006.01)
*G06F 15/16* (2006.01)
*G06F 15/173* (2006.01)

(52) U.S. Cl. .......... 725/32; 709/228; 709/238; 709/237; 709/246; 709/218; 709/219; 709/231; 709/232

(58) Field of Classification Search .................. None
See application file for complete search history.

(56) References Cited

U.S. PATENT DOCUMENTS

| | | | |
|---|---|---|---|
| 5,917,830 A * | 6/1999 | Chen et al. | 370/487 |
| 6,615,039 B1 | 9/2003 | Eldering | |
| 6,831,917 B1 | 12/2004 | Cheriton | |
| 7,096,488 B1 * | 8/2006 | Zhang et al. | 725/105 |
| 2002/0067730 A1 | 6/2002 | Hinderks | |
| 2002/0087976 A1 * | 7/2002 | Kaplan et al. | 725/34 |
| 2002/0184314 A1 | 12/2002 | Riise | |
| 2005/0220132 A1 | 10/2005 | Oman | |
| 2006/0075449 A1 * | 4/2006 | Jagadeesan et al. | 725/113 |
| 2006/0253864 A1 * | 11/2006 | Easty | 725/35 |
| 2008/0010122 A1 * | 1/2008 | Dunmire et al. | 705/14 |

OTHER PUBLICATIONS

Brassil, et al.; Program Insertion in Real-Time IP Multicasts; Computer Communication Review; ACM; New York, NY; Apr. 1, 1999; pp. 49-68; vol. 29, No. 2.
Telecommunications and Internet Converged Services and Protocols for Advanced Networking (TISPAN); Service Layer Requirements to Integrate NGN Services and IPTV; Draft ETSI TS 181 016; ETSI Standards; Feb. 1, 2007; vol. TISPAN, No. V0.0.5.
International Search Report mailed Sep. 9, 2008.

* cited by examiner

*Primary Examiner* — Hai V. Tran
*Assistant Examiner* — Rong Le
(74) *Attorney, Agent, or Firm* — Garlick Harrison & Markison; Holly L. Rudnick

(57) ABSTRACT

Dynamic delivery of different commercials to different viewers is achieved using a network node within an IPTV packet-switched network that is coupled to receive both a multicast television program and commercial programs. The network node is able to identify one or more subscribers to the multicast television program and to identify targeted commercial programs for each of the subscribers. The network node further includes a commercial inserter for inserting the respective targeted commercial program for each of the subscribers into the multicast television program to produce respective customized programs and to transmit the customized programs towards the respective subscribers.

37 Claims, 14 Drawing Sheets

IPTV ARCHITECTURE FOR DYNAMIC COMMERCIAL INSERTION

BACKGROUND OF THE INVENTION

1. Technical Field of the Invention

The present invention relates in general to IP television (IPTV) systems, and in particular, to commercial insertion in IPTV programs.

2. Description of Related Art

With today's widespread use of the Internet as a communication medium, packet-switched networks, such as Internet Protocol (IP), Multiprotocol Label Switching (MPLS), Asynchronous Transfer Mode (ATM) and Ethernet networks, are increasingly being used to transmit digital multimedia data or content (e.g., audio, full-motion audio/video, pictures, etc.). A typical architecture for transmitting multimedia data involves a content server (source) "streaming" the multimedia content over a packet-switched network to a client device (sink). Streaming is a process by which packets containing the multimedia content are continuously received and displayed by a recipient client device. As such, at the client device, the received data is buffered into a cache memory and continuously processed as it is received for real-time presentation to the end user.

An example of an architecture that uses streaming media technology to provide real-time multimedia content to end users is the IP television (IPTV) architecture. Within the IPTV architecture, content source nodes are digital broadcast television providers and sink nodes are typically Set-Top-Boxes (STBs) attached to television (TV) sets. In a typical scenario, a digital broadcast television provider (source) streams a television program over a packet-switched network to one or more STBs (sinks) associated with television viewers who have subscribed to receive the television program.

To distribute the television program to multiple STBs, the broadcast television source typically multicasts the television program over the packet-switched network. Multicast is a communication technique that efficiently utilizes the network infrastructure by requiring a source node to send a packet only once regardless of how many sink nodes it is being sent to. The network nodes, such as switches bridges and routers, replicate the packet, as needed, for distribution to all of the sinks. A multicast group address that identifies a multicast group is used by the source and the sinks to send and receive content. Sources use the multicast group address as the destination address in their data packets, while sinks use the multicast group address to join the multicast group by informing the network that they would like to receive packets sent to that multicast group. Once a sink joins a particular multicast group, the network constructs a multicast distribution tree to ensure that data packets sent to that particular multicast group reach all of the sinks of that particular multicast group. Therefore, multicast does not require source nodes or other intermediate network nodes to know the identities (e.g., IP addresses) of all of the sinks, only the multicast address for the group.

As is known, broadcast television providers often generate income by carrying advertising content in the form of commercials. In traditional broadcast television, local commercials are usually added to television programs at the local broadcast station, such that every viewer within a geographical area covered by the local broadcast station whose television is tuned to a particular channel broadcast by the local broadcast station receives the same commercials. Likewise, with IPTV, local commercials are usually added to multicast television programs at the local video head office (VHO), such that every viewer served by the VHO that has subscribed to a particular multicast television program receives the same commercials.

As is also known, advertisers are continually searching for avenues to provide targeted advertising to specific consumers. However, with the mass marketing approach presently provided by broadcast television (traditional and IPTV), such targeted advertising is not possible. Therefore, advertisers are paying for commercials to be sent to a large number of television viewers, when, in fact, only a small percentage of those television viewers may be target consumers. What is needed is an IPTV architecture that dynamically delivers different commercials to different viewers regardless of their location.

SUMMARY OF THE INVENTION

Embodiments of the present invention provide a network node within a data network that includes a program input port coupled to receive a multicast television program, a commercial input port coupled to receive commercial programs and a controller that operates to identify one or more subscribers to the multicast television program and to identify a targeted one of the commercial programs for each of the subscribers. The network node further includes a commercial inserter for inserting the respective targeted commercial program for each of the subscribers into the multicast television program to produce respective customized programs and a subscriber output port coupled to transmit the customized programs towards the respective subscribers.

In one embodiment, the network node further includes a subscriber input port coupled to receive a subscribe message from one of the subscribers. The controller determines from the subscribe message a program source address identifying a program source of the multicast television program to which the subscriber is subscribing and a commercial source address identifying a commercial source of one of the commercial programs to insert into the multicast television program to produce the customized program for the subscriber. In a further embodiment, the controller generates from the subscribe message a television program subscribe message addressed to the program source by the program source address for transmission towards the program source and a commercial program subscribe message addressed to the commercial source by the commercial source address for transmission towards the commercial source.

In an exemplary embodiment, the subscribe message includes a combined address that identifies the program source address and the commercial source address, and the network node further includes a table mapping the combined address to the program source address and the commercial source address. In another exemplary embodiment, the subscribe message is sent within a packet containing the program source address, and that packet is encapsulated in a different layer packet containing the commercial source address. In yet another exemplary embodiment, the subscribe message includes the program source address and the commercial source address. For example, the subscribe message may be a modified subscribe message modified by an address modification node to include the commercial source address.

In another embodiment, the network node further includes a schedule input port coupled to receive a commercial schedule including a multicast stream of commercials for insertion into a respective one of the customized programs associated with one of the subscribers. The controller determines a current timing parameter associated with the multicast television program and accesses the commercial schedule to identify a current commercial from the multicast stream of commercials associated with the current timing parameter. The commercial inserter inserts the current commercial into the customized program associated with the subscriber. In an exemplary embodiment, the schedule input port is coupled to receive the commercial schedule from the commercial source or the program source. In another exemplary embodiment, the subscribe message further includes a commercial schedule identifier identifying the commercial schedule, and the controller uses the commercial schedule identifier to retrieve the commercial schedule from a database. In another exemplary embodiment, the subscribe message includes a demographic identifier associated with the subscriber, and the controller uses the demographic identifier to retrieve the commercial schedule from a commercial policy server.

In yet another embodiment, the network node is a DSLAM at an end office coupled to at least one of the subscribers. In still another embodiment, the network node is dynamically selected from intermediate nodes between the program source node multicasting the television program and the DSLAM.

In a further embodiment, the network node also includes a television queue containing a stream of program packets forming the multicast television program and a commercial queue containing a stream of commercial packets forming a selected one of the commercial programs. The commercial inserter selects either a next one of the program packets from the television queue or a next one of the commercial packets from the commercial queue for insertion into one of the customized programs. In an exemplary embodiment, the controller receives a program splice mark indication within a multicast layer 2 or layer 3 protocol stack carrying the multicast television program that identifies a program splice mark point between two of the program packets within the program queue, and the commercial inserter selects program packets from the program queue for insertion into the customized program until the program splice mark point is reached and then selects commercial packets from the commercial queue for insertion into the customized program. The splice mark indication may be either in-band or out-of-band.

Embodiments of the present invention further provide a method for customizing broadcast television. The method including receiving a multicast television program and one or more commercial programs, identifying one or more subscribers to the multicast television program and determining a targeted one of the commercial programs for each of the subscribers. The method further includes inserting the respective targeted commercial program for each of the subscribers into the multicast television program to produce respective customized programs and transmitting each of the customized programs towards the respective subscribers.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
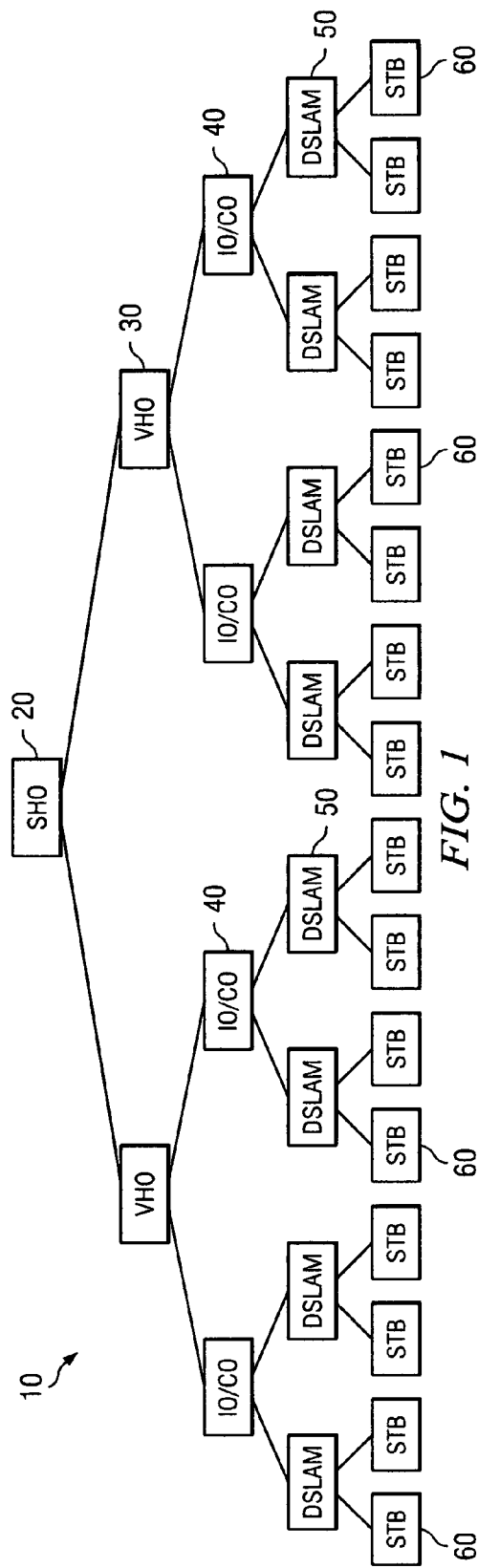
FIG. 1 illustrates an exemplary IPTV architecture, in accordance with embodiments of the present invention.

Referring to FIG. 1, there is illustrated an exemplary Internet Protocol Television (IPTV) architecture 10 capable of implementing various embodiments of the present invention. The IPTV architecture 10 includes a national Super Head Office (SHO) 20, several local Video Head Offices (VHOs) 30, IP/Central Offices (IP/COs) 40, Digital Subscriber Line Access Multiplexers (DSLAMs) 50 and a plurality of customer Set-Top Boxes (STBs) 60.

As used herein, the term DSLAM 50 refers to a network device, usually located at the telephone company IP/CO 40, that connects multiple customer Digital Subscriber Lines (DSLs) to a high speed packet-switched network using multiplexing techniques. As also used herein, the term STB 60 refers to a device that connects a television set (not shown) to an external signal, turns the signal into audio/video content and then displays the audio/video content on the television screen.

As shown in FIG. 1, each of the STBs 60 is coupled to one of the DSLAMs 50, which in turn is coupled to a local IP/CO 40, local VHO 40 and the national SHO 20. The SHO 20, VHOs 30, IP/Cos 40 and DSLAMs 50 are all interconnected via a packet-switched network. For example, the packet-switched network may include, but is not limited to, one or more of an Internet Protocol (IP), Multiprotocol Label Switching (MPLS), Asynchronous Transfer Mode (ATM) or Ethernet network.

The SHO 20, VHO's 30, IP/COs 40 and DSLAMs 50 operate to stream digital audio/video content containing television programs to one or more STBs 60. The SHO 20 streams national television programs associated with a particular broadcasting station to the STBs 60 via the VHOs 30, IP/COs 40 and DSLAMs 50, while the VHOs 30 stream local television programs to the STBs 60 via the IP/COs 40 and DSLAMs 50. The SHO 20 and VHOs 30 stream the television programs to the STB's 60 by multicasting the television programs over the packet-switched network. To receive a particular television program, a television subscriber must first join the multicast group to which the multicast television program is distributed. For example, the STB 60 can send a request to join a particular multicast group to the DSLAM 50, which passes the request through the packet-switched network until it is received at a network node that is able to join the STB 60 to the multicast group (e.g., a network node that is currently in the multicast distribution tree to receive the requested television program). Once the STB 60 joins the requested multicast group, the network constructs a new multicast distribution tree that ensures that data packets sent to that particular multicast group reach all of the STBs 60 of that particular multicast group.

Each television program usually includes one or more national and/or local commercials. The existing approach within the IPTV architecture 20 is to add the local commercials in the VHO 30. For example, the VHO 30 typically inserts the commercials into the main television program by manipulating the audio/video streams at the application layer. After insertion, the commercials are transmitted following the multicast tree of the main television program. However, all of the end television subscribers viewing this main television program will receive the same commercials.

In accordance with embodiments of the present invention, commercials are transmitted separately from the main television program following a different multicast tree based on various criteria, as will be described in more detail below. Then, the commercials are inserted at intermediate network nodes in the multicast tree using layer 2 or 3 protocols.

Figure 2:
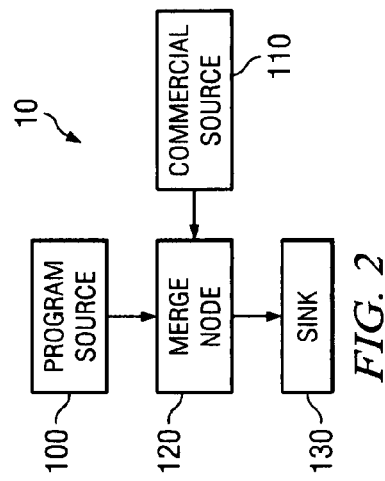
FIG. 2 illustrates an exemplary IPTV architecture for dynamically inserting commercials into television programs to provide customized television programs to television subscribers, in accordance with embodiments of the present invention.

For example, referring now to FIG. 2, the network nodes within the IPTV architecture are classified as one of program source nodes 100, commercial source nodes 110, sink nodes 130 and merge nodes 120. Program and commercial source nodes 100 and 110 are roots of respective multicast trees. In particular, within the IPTV architecture, a Program Source Node is a root node of a multicast tree for a television program into which commercials are to be inserted. The television program has a unique multicast address, which could be in several formats, including IP, Ethernet, and MPLS. In addition, a Commercial Source Node is a root node of a multicast tree for one or more television commercials. If there are multiple commercials, they may share a common multicast address or they could have different multicast addresses. Furthermore, a sink node is a node that receives a multicast stream that contains both a television program and commercials. A sink node is typically a Set-Top Box (STB) attached to a television (TV) set.

Merge nodes 120 are intermediate network nodes in the multicast tree paths of both the television program and commercial program trees. More specifically, a merge node 120 is a node that inserts commercials into television programs. This merge operation is performed at the network layer or below. For example, there are a number of layer 2 and 3 multicast protocols, including, but not limited to, IGMP, GMRP, MVRP, RSVP, SRP (802.1at), PIM-SM, PIM-DM, and PIM-SSM. All of these protocols have a message that is sent from the sink node 130 toward the program source node 100 that indicates the sink node's 130 desire to receive a particular multicast stream. In IGMP, GMRP, MVRP, and SRP, this message is called a JOIN message, in RSVP, it is called a RESV message, and in future protocols it may be called by other names. All such messages are referred to herein as "subscribe" messages.

A particular merge node 120 for a particular subscriber can be selected either dynamically using a protocol or manually configured by administrators. With the manual configuration option, the merge node 120 is configured into the network, and rarely changes. The merge node 120 can be selected from any intermediate node in the packet-switched network between the program source node 100 and the sink node 130 that meets certain criteria.

For example, assume A is a sink node, B is a program source node, and C is any node in the network that is neither A nor B. If every time A subscribes to B, the subscribe message from A passes through the same port on C and subscribe messages from no other sink node pass through that port, node C can be statically configured as the merge node that should always used whenever A subscribes to B. This condition is true, for example, in the case where A is a Set-Top Box (STB), A is the only STB in a house, and C is the only DSLAM associated with A. In this case, any packets to or from A must pass through the same port on C and packets from no other STB pass through that port. In addition, the above condition is sufficient for static configuration, because when the DSLAM receives a subscribe message, the DSLAM can tell which STB sent the subscribe message by noting the port on which subscribe message was received. (Each dropside port of the DSLAM receives subscribe messages from only one STB.) Even if there are two STBs in the same house that share the same port on the DSLAM, this configuration would not be problematic if both STBs received the same commercials.

However, if a STB is multi-homed on two DSLAMS, the DSLAMs may not be able to tell which STB is the source of the subscribe message by looking at the incoming port number. In this case, static configuration may not work. In addition, static configuration becomes more problematic if the merge node is deeper in the network than the DSLAM unless there are significant restrictions on the topology of the network. Furthermore, when the merge node is deeper in the network than the DSLAM, static configuration also has a problem with recovery after a network failure, since after recovery, the merge node may no longer be in the multicast tree between the program source node and the sink node.

Therefore, the protocol option for choosing a merge node is more desirable than the fixed configuration option when the merge node is deeper in the network than the DSLAM. With the protocol option, whenever a merge node is required, a message-passing protocol is used to select an intermediate node in the network to serve this function. This messagepassing protocol is a new protocol that contains information beyond what existing multicast routing protocols contain.

For example, assume that a candidate merge node receives two subscribe messages on two ports, and that both subscribe messages look the same, in that they both contain a request to receive a multicast stream from program source X. However, the two subscribe message are not supposed to be treated the same. One subscribe message should create a stream that contains commercials from commercial source 1 and the other should create a stream that contains commercials from commercial source 2. With existing multicast routing protocols, there is currently not enough information in the subscribe messages for the merge node to know which commercials to send to which output ports.

Therefore, in accordance with embodiments of the present invention, the message-passing protocol includes enough information to enable a dynamically selected merge node to be able to associate commercial source nodes 110 with program source node/sink node 100/130 pairs, as will be described in more detail below in connection with FIGS. 4-8.

Figure 3:
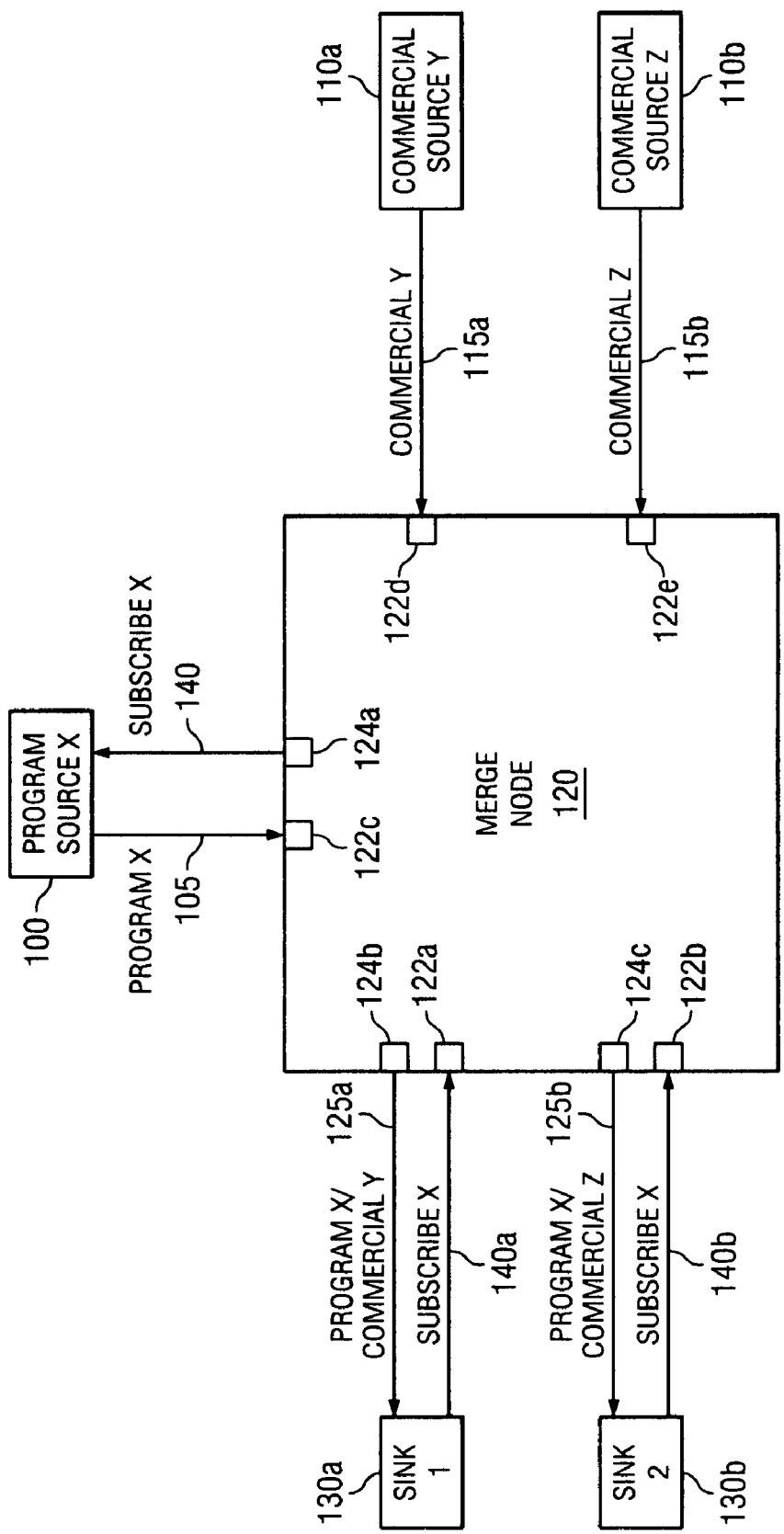
FIGS. 3-9 illustrate various exemplary embodiments for associating television commercials with television subscribers to produce and provide customized television programs to the television subscribers, in accordance with embodiments of the present invention.

Turning now to FIG. 3, an example of a statically configured merge node 120 is shown. Two sinks, Sink 1 130a and Sink 2 130b are shown in FIG. 3. Each sink node 130a and 130b transmits a respective subscribe message 140a and 140b towards the statically configured merge node 120 to subscribe to the multicast address associated with the TV program X 105. Thus, each subscribe message 140a and 140b carries an identifier of the particular multicast stream that carries TV program X 105.

The merge node 120 receives the subscribe message 140a from Sink 1 130a on a first input port 122a and the subscribe message 140b from Sink 2 130b on a second input port 122b. If the merge node 120 is not currently in the multicast tree to receive TV program X 105, the merge node 120 passes a subscribe message 140 towards the Program Source node for TV program X 105 through the packet switched-network via output port 124a. The network reconfigures the multicast tree to include the merge node 120 in the tree, so that the TV program X is received at the merge node 120 via input port 122c. In addition, the merge node 120 is included in the multicast trees for multiple commercials.

For example, as shown in FIG. 3, the merge node 120 is coupled via the multicast tree in the packet-switched network to receive Commercial Y 115a from Commercial Source Y 110a via input port 122d and to receive Commercial Z 115b from Commercial Source Z 110b via input port 122e. Commercials Y and Z are packet streams containing one or more commercials to be inserted into the program 105 for each of the sinks 130a and 130b.

Based on the input ports 122a and 122b through which the subscribe messages 140a and 140b are received, the merge node 120 is able to identify the sinks 130a and 130b sending the subscribe messages 140a and 140b. Since the merge node 120 is statically configured in the network for sinks 130a and 130b, the merge node 120 can be configured with information identifying which commercials are to be sent to which sinks 130a and 130b. For example, as shown in FIG. 3, the merge node 120 is provided with knowledge (internally or externally) that Sink 1 130a should receive Commercial Y 115a and Sink 2 130b should receive Commercial Z 115b. Therefore, the merge node 120 operates to insert Commercial Y 115a into Program X 105 for Sink 1 130a to produce a customized program 125a for transmission to Sink 1 130a via output port 124b. In addition, the merge node operates to insert Commercial Z 115b into Program X 105 for Sink 2 130b to produce a customized program 125b for transmission to Sink 2 130b via output port 124c.

Figure 4:
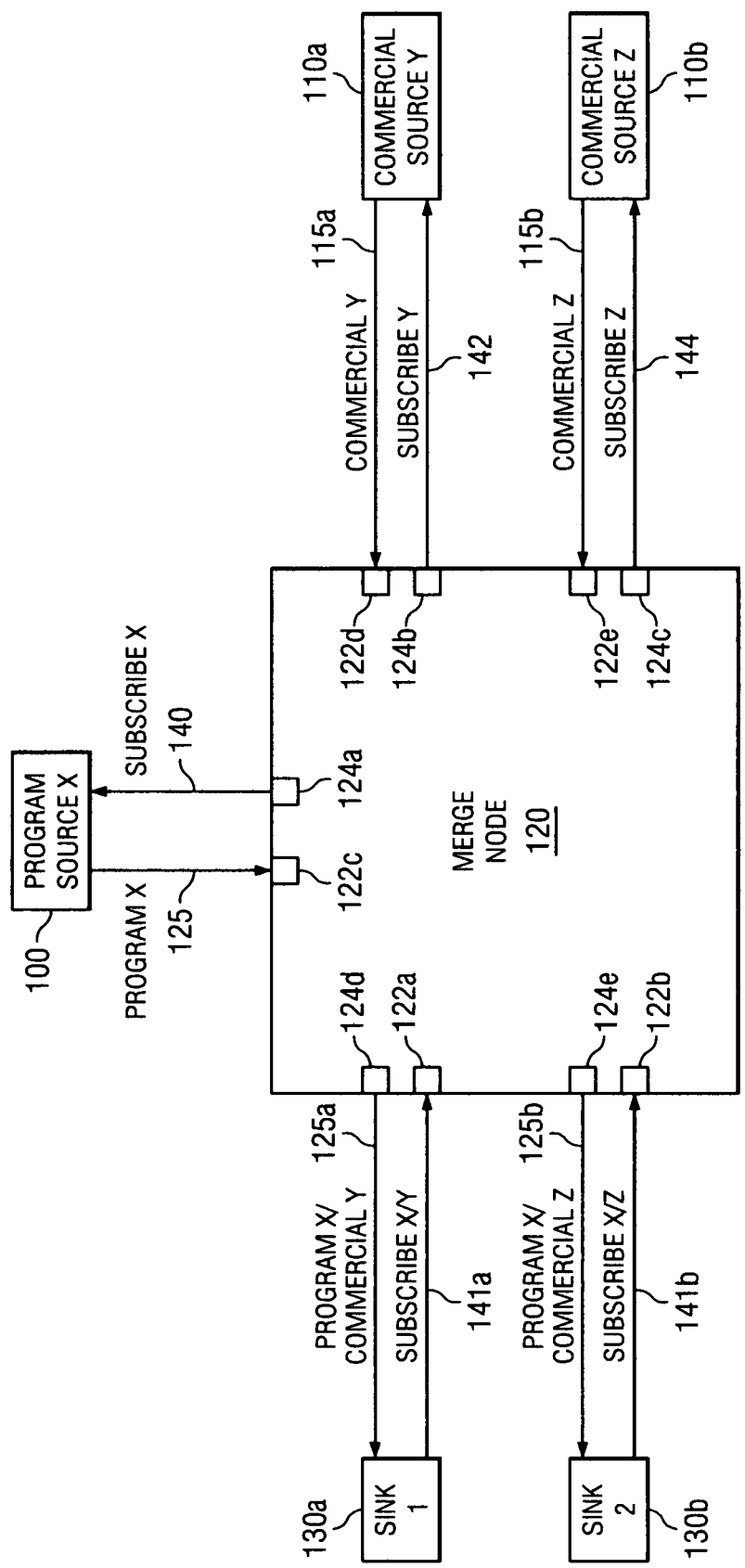

FIGS. 4-9 illustrate various protocol options for dynamically selecting a merge node that is able to associate commercial source nodes 110 with program source node/sink node 100/130 pairs. In one embodiment, as shown in FIG. 4, when a particular sink node (i.e., Sink 1 130a) tunes in (subscribes to) a TV program (TV Program X), the sink node 130a selects a program source node 100 for TV Program X and also selects a particular commercial source node 110a for Commercial Y. To accomplish this, the subscribe message is modified to contain an additional field including the commercial source address. This results in what is, in effect, a two-part address, the program source address (i.e., the multicast group address for Program X) and the commercial source address (i.e., the multicast group address for Commercial Y) for the subscribe message.

There are a number of different ways that the two-part address can be included in the subscribe message of any multicast routing protocol, and the present invention is not limited to any particular way. By way of example though, one way is to modify the format of the subscribe packet to have a two-part address. Another way is to keep the format the same, but include a table within the merge node 120 that maps ordinary multicast addresses to combined program and commercial addresses. As used herein, the term "ordinary multicast address" is either an Ethernet, IP, or MPLS multicast address. The mapping table can be downloaded to every potential merge node in the network. Likewise, an inverse mapping table can be downloaded to the sink nodes 130a and 130b. The sink nodes 130a and 130b map a two-part address to an ordinary one-part address and the merge node 120 performs the reverse mapping.

Still another way in which to provide a two-part address is to add a new protocol layer above layer 2 or 3 or a new sub-layer in layer 2 or 3 that includes the commercial source address and encapsulates the existing subscribe packet, but does not change any fields in the existing subscribe packet. Yet another way is to assign an Ethernet VLAN to a commercial's multicast address or other commercial address identifier. However, it should be understood that the present invention is not limited to any particular mechanism for providing a two-part address associated with a subscribe message for IPTV applications.

Referring again to FIG. 4, in an exemplary operation, the subscribe message 141a sent from the sink node 130a toward the program source node 100 including the two part address is routed by a multicast routing protocol until the subscribe message reaches a candidate merge node 120. Between the sink node 130a and the candidate merge node 120, the subscribe message 141a is routed as if it only contained the program source address. The candidate merge node 120 receives the subscribe message via input port 122a and "forks" the single subscribe message 141a from the sink node 130a into two conventional subscribe messages, a program source conventional subscribe message 140 and a commercial source conventional subscribe message 142, each containing only a single address. The merge node 120 then forwards the program source conventional subscribe message 140 on towards the program source node 100 via output port 124a using the program source address (if the merge node 120 is not already within the multicast tree for Program X) and the commercial source conventional subscribe message 142 toward the commercial source 110a via output port 124b using the commercial source address (if the merge node 120 is not already within the multicast tree for Commercial Y).

Likewise, the subscribe message 141b sent from the sink node 130b includes a two-part address identifying both the program source node 100 and a particular commercial source node 110b for Commercial Z. The merge node 120 receives the subscribe message 141b at input port 122b, "forks" the single subscribe message 141b from the sink node 130b into the program source conventional subscribe message 140 and a commercial source conventional subscribe message 144 and, if needed, forwards the program source conventional subscribe message 140 on towards the program source node 100 via output port 124a using the program source address and the commercial source conventional subscribe message 144 toward the commercial source 110b via output port 124c using the commercial source address.

In response to the subscribe messages, the merge node 120 is included in the respective multicast trees for Program X, Commercial Y and Commercial Z, so that the merge node is coupled via the multicast tree in the packet-switched network to receive Program X 105 from the Program Source node 100 via input port 122c, Commercial Y 115a from Commercial Source Y 110a via input port 122d and to receive Commercial Z 115b from Commercial Source Z 110b via input port 122e. Based on the two-part addresses of the subscribe messages 141a and 141b, the merge node 120 is able to determine that Sink 1 130a should receive Commercial Y 115a and Sink 2 130b should receive Commercial Z 115b. Therefore, the merge node 120 operates to insert Commercial Y 115a into Program X 105 for Sink 1 130a to produce a customized program 125a for transmission to Sink 1 130a via output port 124d. In addition, the merge node 120 operates to insert Commercial Z 115b into Program X 105 for Sink 2 130b to produce a customized program 125b for transmission to Sink 2 130b via output port 124e.

Figure 5:
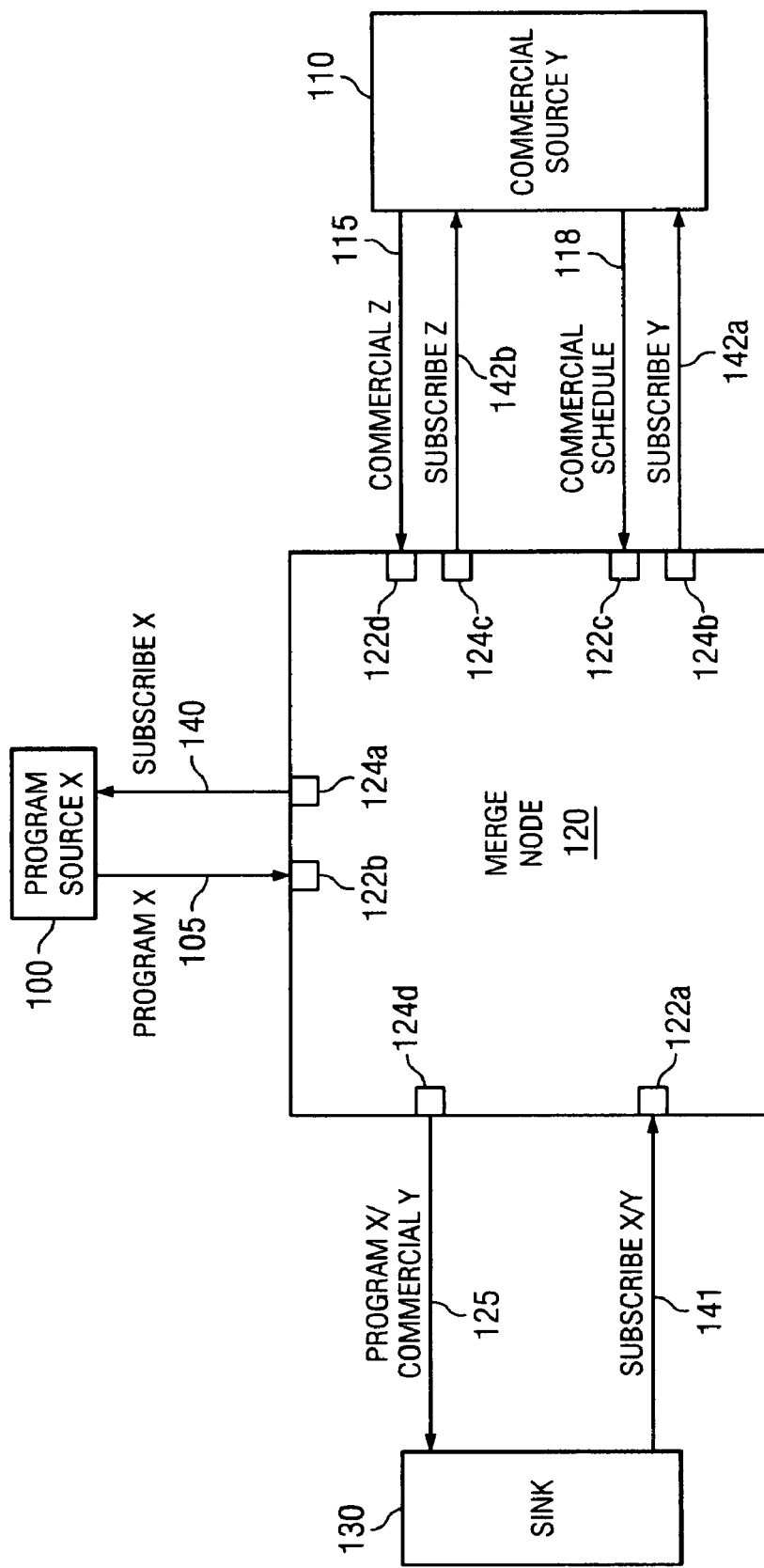

In another embodiment, as shown in FIG. 5, in a variation of the two-part address scheme described above in connection with FIG. 4, a commercial schedule 118 is provided to identify a particular commercial to be sent to the sink node 130. A "commercial schedule" 118 is defined herein as a schedule of commercials. In its simplest form, a commercial schedule 118 is a list of elements where each element corresponds to one commercial, and each element contains at least the following information: (1) the multicast address of the commercial source; (2) the time the commercial is scheduled to start; and (3) the time the commercial is scheduled to end. In addition, the commercial schedule itself (the list) has a unique identifier.

A single copy of a commercial schedule 118 can be stored on a centralized server or the commercial schedule 118 can be distributed. The commercial schedule 118 can be downloaded to the merge node 120 just before it is need or it can be downloaded in advance. The commercial schedule 118 may even be downloaded to a node before the node becomes a merge node 120. The commercial schedule can also be downloaded to the merge node 120 in pieces in a caching scheme.

The merge node 120 uses the commercial schedule 118 to determine when to insert which commercials 115 into the program stream 105. Using the example shown in FIG. 5, when the sink node 130 tunes in (subscribes to) the TV program X, the sink node 130 includes the two-part address, one for the program source address (i.e., the multicast group address for Program X) and one for the commercial source address (i.e., the multicast group address for Commercial Y) within the subscribe message 141 that is routed to the merge node 120.

The merge node 120 receives the subscribe message via input port 122a and "forks" the single subscribe message 141a from the sink node 130 into two conventional subscribe messages, a program source conventional subscribe message 140 and a commercial source conventional subscribe message 142a, each containing only a single address, as described above. The merge node 120 then forwards the program source conventional subscribe message 140 on towards the program source node 100 via output port 124a using the program source address (if the merge node 120 is not already within the multicast tree for Program X) and the commercial source conventional subscribe message 142a toward the commercial source 110 via output port 124b using the commercial source address.

In response to the program subscribe message 140, the merge node 120 is included in the multicast tree for Program X, so that the merge node 120 is coupled via the multicast tree in the packet-switched network to receive Program X 105 from the Program Source node 100 via input port 122b. In addition, in response to the commercial subscribe message 142, instead of sending Commercial Y, as originally requested in the original commercial subscribe message 142, the commercial source node 110 sends a commercial schedule 118 to the merge node 120 via input port 122c. This may be done, for example, when the targeted commercial for the sink node has changed, but the sink node has not yet been updated with the new commercial information.

The merge node 120 compares the current time to the commercial schedule 118 to determine which commercial (Commercial Z) to insert into Program X 105 for sink node 130. Upon identifying the commercial for insertion, the merge node 120 sends a new commercial subscribe message 142b to the commercial source 110 via output port 124c to subscribe to the new commercial (Commercial Z), as identified in the commercial schedule 118. In response to the new subscribe message 142b, the merge node 120 is included in the multicast tree for Commercial Z, so that the merge node 120 is coupled via the multicast tree in the packet-switched network to receive Commercial Z 115 from the Commercial Source node 110 via input port 122d. The merge node 120 then operates to insert Commercial Z 115 into Program X 105 to produce the customized program 125 for transmission to sink node 130 via output port 124d.

Figure 6:
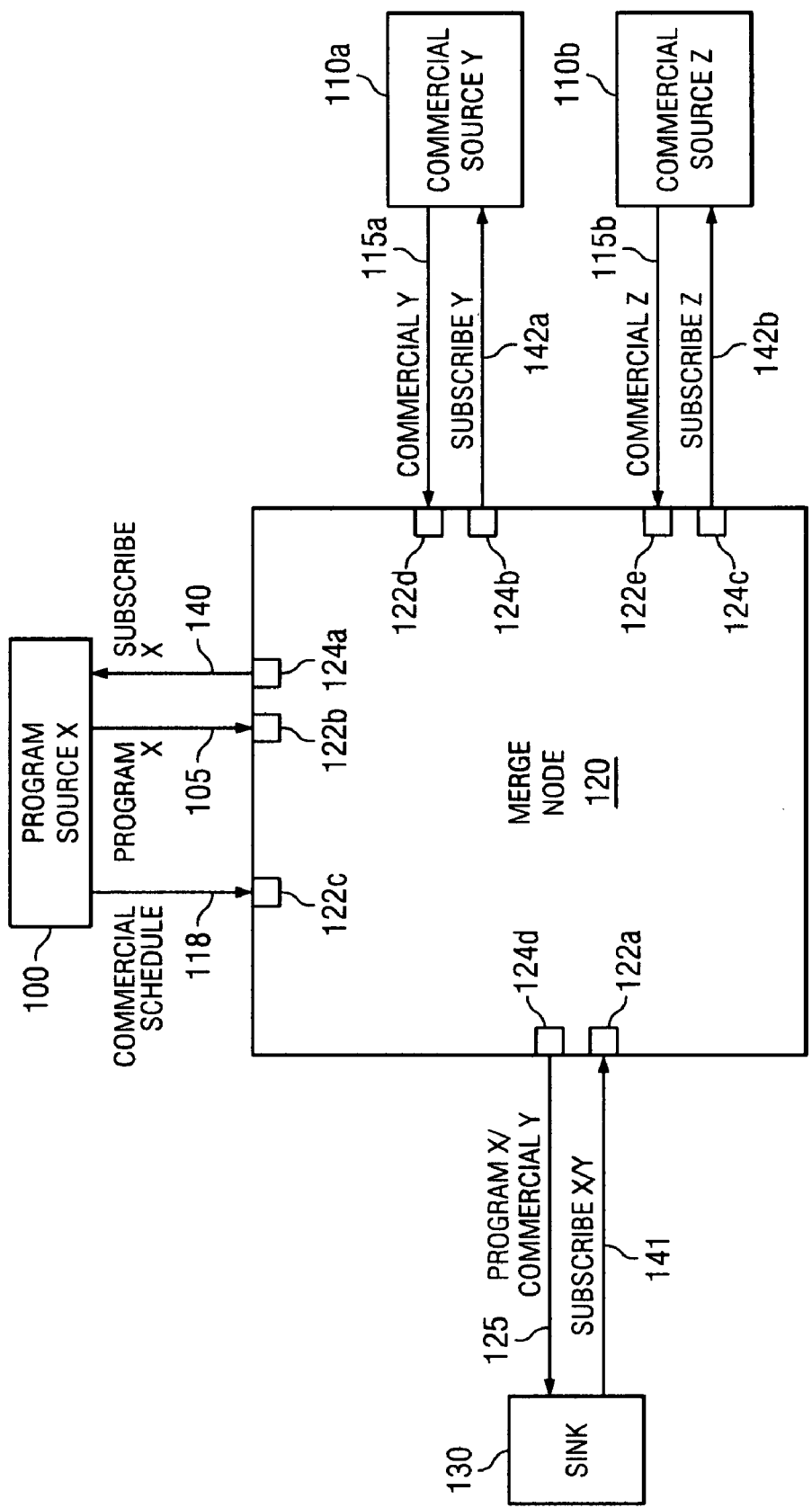

FIG. 6 illustrates yet another variation of the two-part address scheme in which the commercial schedule 118 is carried in the same multicast stream as the TV Program X 105 coming from the program source node 100. For example, as shown in FIG. 6, when the sink node 130 tunes in (subscribes to) the TV program X by including the two-part address within the subscribe message 141 via input port 122a, the merge node 120 forwards the program subscribe message 140 to the program source node 100 via output port 124a and the commercial subscribe message 142a to the commercial source 110a via output port 124b. In response to the program subscribe message 140, the program source node 100 multicasts the TV program X 105 to the merge node 120 via input port 122b, and in response to the commercial subscribe message 142a, the commercial source 110a multicasts the requested commercial, "Commercial Y" 115a to the merge node via input port 122d.

In addition, the program source node 100 also forwards the commercial schedule 118 to the merge node 120 via input port 122c. The merge node 120 again compares the current time to the commercial schedule 118 to determine if a commercial different than Commercial Y 115a should be inserted into Program X 105 for sink node 130. If so, the merge node sends a new commercial subscribe message 142b for the new commercial "Commercial Z" 115b to the appropriate commercial source, here commercial source 115b, via output port 124c. Upon receiving Commercial Z 115b via input port 122e, the merge node 120 inserts Commercial Z 115b into Program X 105 for sink node 130 to produce the customized program 125 for transmission to sink node 130 via output port 124d.

Figure 7:
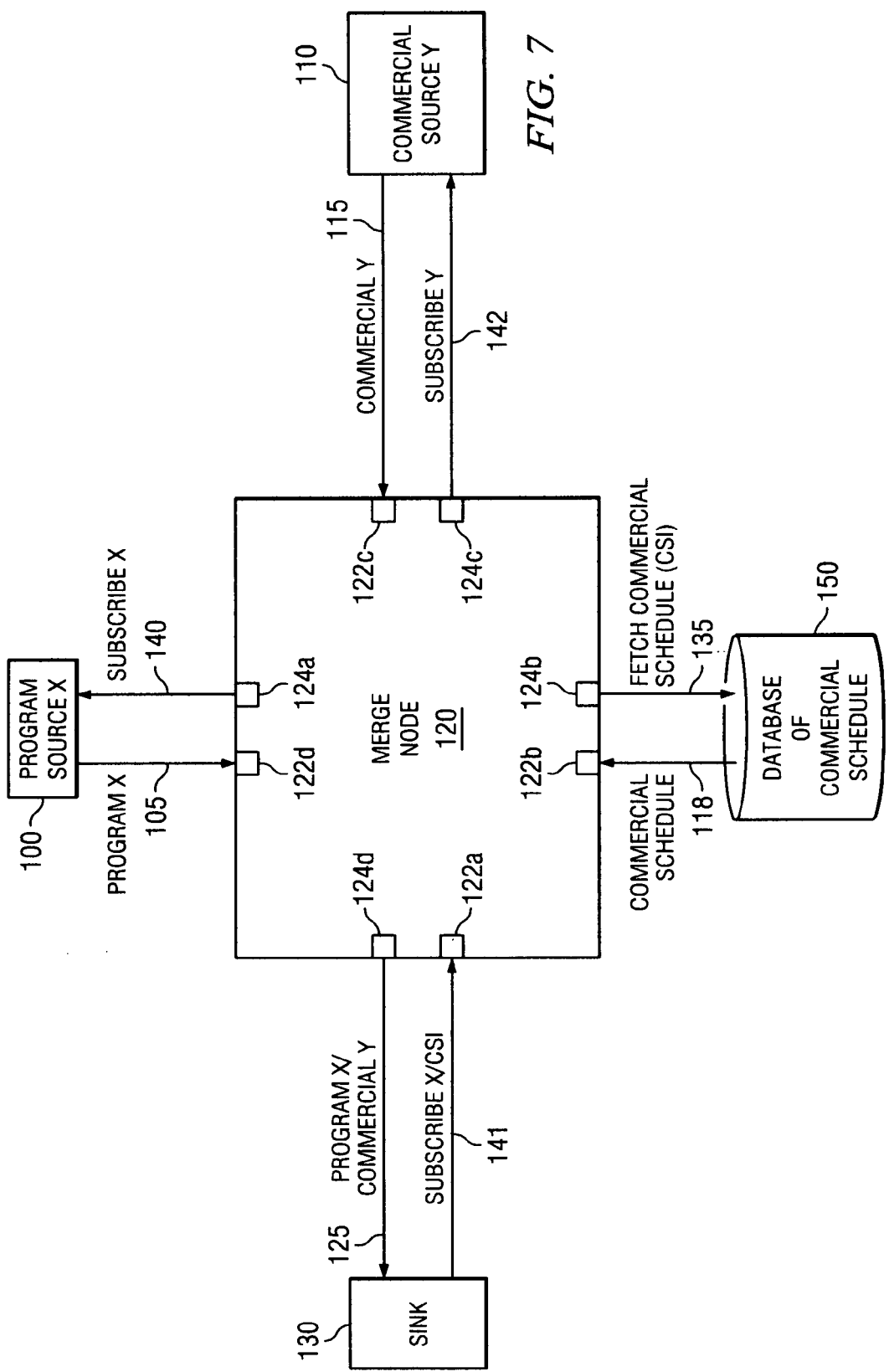

In another embodiment, as shown in FIG. 7, the subscribe message 141 sent by the sink node 130 carries the program source address and a commercial schedule identifier (CSI). The merge node 120 uses the commercial schedule identifier to either lookup or download the corresponding commercial schedule. For example, as shown in FIG. 7, when the sink node 130 tunes in (subscribes to) the TV program X, the sink node 130 includes the program source address (i.e., the multicast group address for Program X) and the CSI within the subscribe message 141 that is routed to the merge node 120.

The merge node 120 receives the subscribe message via input port 122a and extracts the CSI from the subscribe message 141. The merge node 120 then forwards the subscribe message (without the CSI) 140 on towards the program source node 100 via output port 124a using the program source address (if the merge node 120 is not already within the multicast tree for Program X). In addition, the merge node transmits a Fetch Commercial Schedule message, 135 including the CSI extracted from the received subscribe message 141 towards a database of commercial schedules 150 via output port 124b to retrieve the commercial schedule identified by the CSI via input port 122b. Using information in the commercial schedule and the current time as input, the merge node 120 looks up the appropriate commercial source address (e.g., using a table stored in the merge node 120), and transmits a commercial subscribe message 142 towards the appropriate commercial source 110 (e.g., Commercial Source Y) via output port 124c (if the merge node 120 is not already within the multicast tree for Commercial Y).

In response to the subscribe messages 140 and 142, the merge node 120 is included in the respective multicast trees for Program X and Commercial Y, so that the merge node 120 is coupled via the multicast tree in the packet-switched network to receive Program X 105 from the Program Source node 100 via input port 122d and Commercial Y 115 from Commercial Source Y 110 via input port 122c. The merge node 120 inserts Commercial Y into Program X 105 for sink node 130 to produce the customized program 125 for transmission to sink node 130 via output port 124d.

Figure 8:
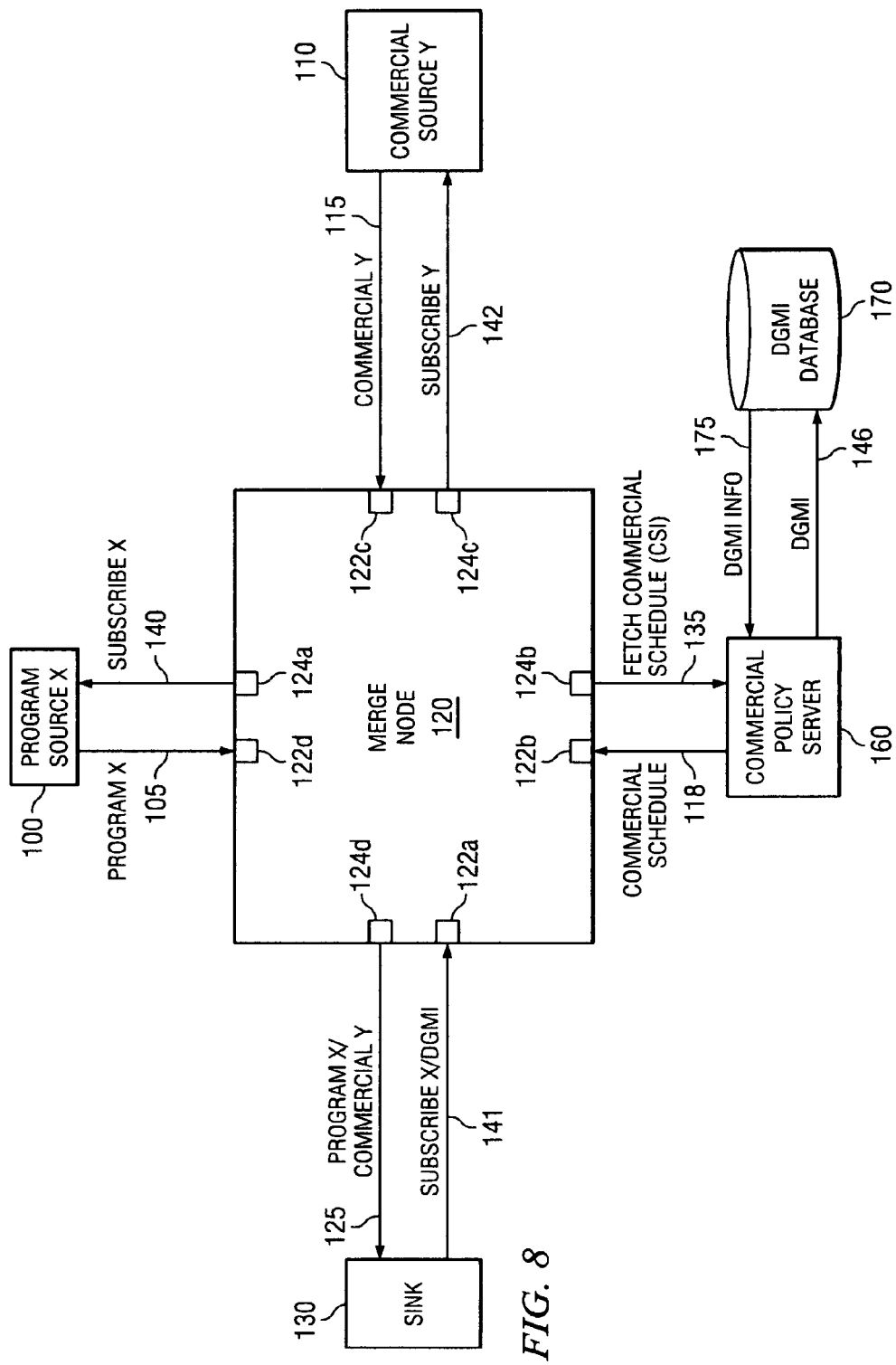

In yet another embodiment, as shown in FIG. 8, the subscribe message 141 sent by the sink node 130 carries the program source address and a demographic, geographic and marketplace indicator (DGMI). The DGMI is an identifier of a data structure that contains information about a specific sink node. This data structure contains demographic, geographic and marketplace information about the person or people who are likely to be watching a TV associated with that sink node. Examples of demographic information are the person's age, native language, and musical tastes. Examples of geographic information are a person's mailing address and latitude and longitude. Examples of marketplace information are whether or not a person has a membership of discount shopping store and whether or not a person has purchased a premium sports channel. In an exemplary embodiment, the DGMI is a URI or a network addressable location where demographic, geographic, and marketplace information about a specific sink is stored.

For example, referring again to FIG. 8, when the sink node 130 tunes in (subscribes to) the TV program X, the sink node 130 includes the program source address (i.e., the multicast group address for Program X) and the DGMI associated with that sink node 130 within the subscribe message 141 that is routed to the merge node 120.

The merge node 120 receives the subscribe message via input port 122a and extracts the DGMI from the subscribe message 141. The merge node 120 then forwards the subscribe message (without the DGMI) 140 on towards the program source node 100 via output port 124a using the program source address (if the merge node 120 is not already within the multicast tree for Program X). In addition, the merge node transmits a Fetch Commercial Schedule message 135 including the DGMI extracted from the received subscribe message 141 towards a commercial policy server 160 via output port 124b to retrieve the commercial schedule for sink node 130.

The commercial policy server 160, in turn, forwards the DGMI 146 towards a DGMI database 170 that contains the demographic, geographic and marketplace information 175 for each DGMI 146. The commercial policy server 160 inputs the retrieved demographic, geographic and marketplace information 175 to an algorithm that dynamically determines what commercials should be associated with which program-source/sink pair. Then, the commercial policy server generates and forwards a commercial schedule 118 to the merge node, which is received via input port 122b.

Using information in the commercial schedule and the current time as input, the merge node 120 looks up the appropriate commercial source address (e.g., using a table stored in the merge node 120), and transmits the commercial subscribe message 142 towards the appropriate commercial source 110 (e.g., Commercial Source Y) via output port 124c (if the merge node 120 is not already within the multicast tree for Commercial Y). In response to the subscribe messages 140 and 142, the merge node 120 is included in the respective multicast trees for Program X and Commercial Y, so that the merge node 120 is coupled via the multicast tree in the packet-switched network to receive Program X 105 from the Program Source node 100 via input port 122d and Commercial Y 115 from Commercial Source Y 110 via input port 122c. The merge node 120 inserts Commercial Y into Program X 105 for sink node 130 to produce the customized program 125 for transmission to sink node 130 via output port 124d.

Figure 9:
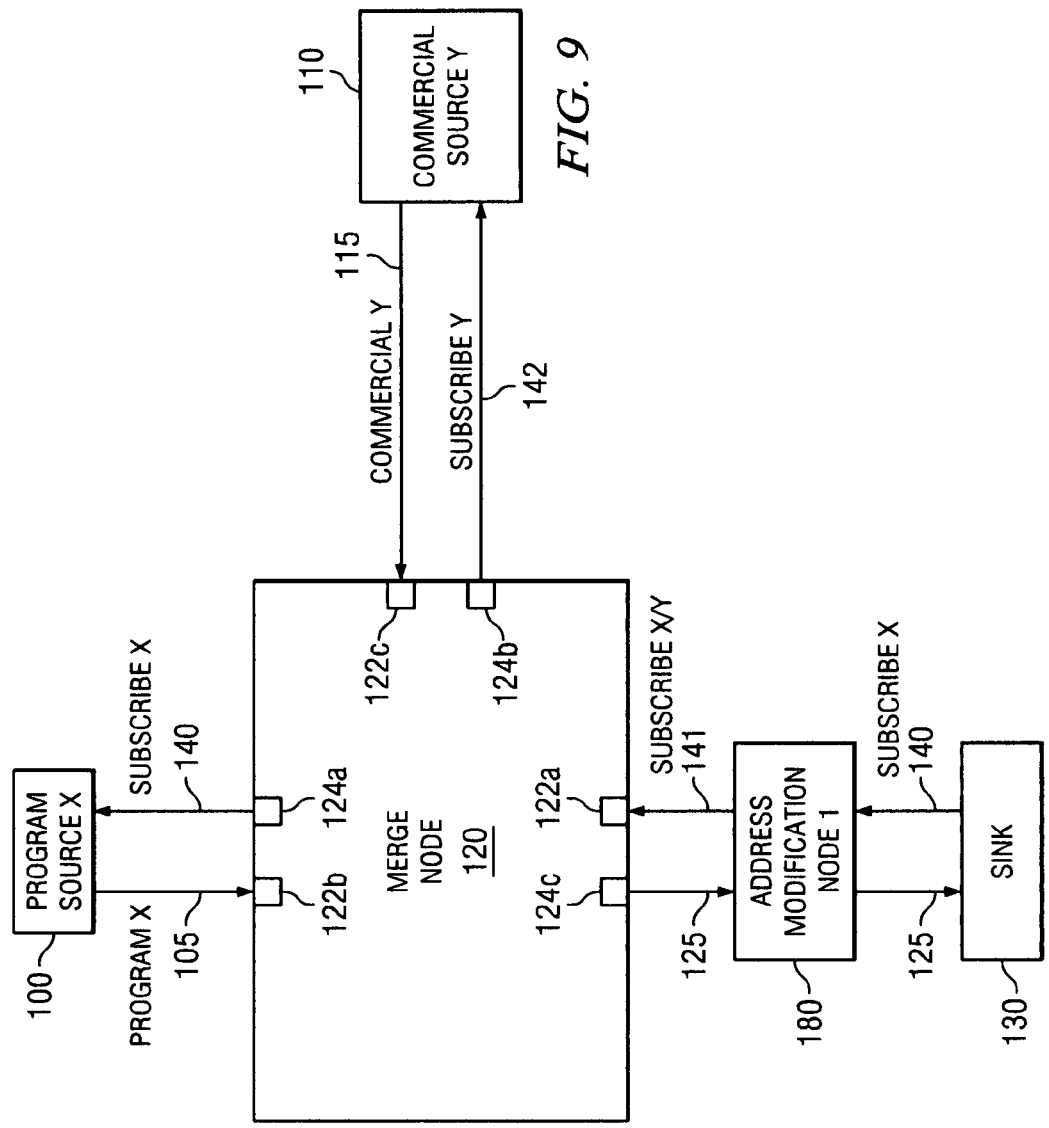

Turning now to FIG. 9, in another embodiment, a two-part address is still used to identify the program and commercial sources, but instead of the sink node generating the two-part address, the address sent from the sink is a conventional one-part address, which is converted to a two-part address by an intermediate node. Thus, as shown in FIG. 9, when the sink node 130 sends a subscribe message 140 with the program source address (multicast address for Program X) through the packet-switched network, the subscribe message is intercepted by an Address Modification Node (Address Modification Node 1) 180.

The Address Modification Node 180 modifies the subscribe message to include both the program source address and a commercial source address for sink node, and transmits the two-part address subscribe message 141 to the merge node 120. The merge node 120 receives the two-part address subscribe message 141 at input port 122a, "forks" the single subscribe message 141 into the program source conventional subscribe message 140 and the commercial source conventional subscribe message 142 and, if needed, forwards the program source conventional subscribe message 140 on towards the program source node 100 via output port 124a using the program source address and the commercial source conventional subscribe message 142 toward the commercial source 110 via output port 124b using the commercial source address.

In response to the subscribe messages, the merge node 120 is included in the respective multicast trees for Program X and Commercial Y, so that the merge node 120 is coupled via the multicast tree in the packet-switched network to receive Program X 105 from the Program Source node 100 via input port 122b and Commercial Y 115 from Commercial Source Y 110 via input port 122c. Based on the two-part addresses of the subscribe message 141, the merge node 120 is able to determine that sink node 130 should receive Commercial Y 115, and operates to insert Commercial Y 115a into Program X 105 to produce the customized program 125 for transmission to sink node 130 via output port 124c.

In an exemplary embodiment, sink node 130 is an STB and the Address Modification Node 1 180 that modifies the address is either a Residential Gateway or a DSLAM. The DSLAM would modify the address based on the port on which the subscribe message is received. Since the two-part address is only used between network nodes, the protocol stack in the sink (STB) does not need to be changed.

Figure 10:
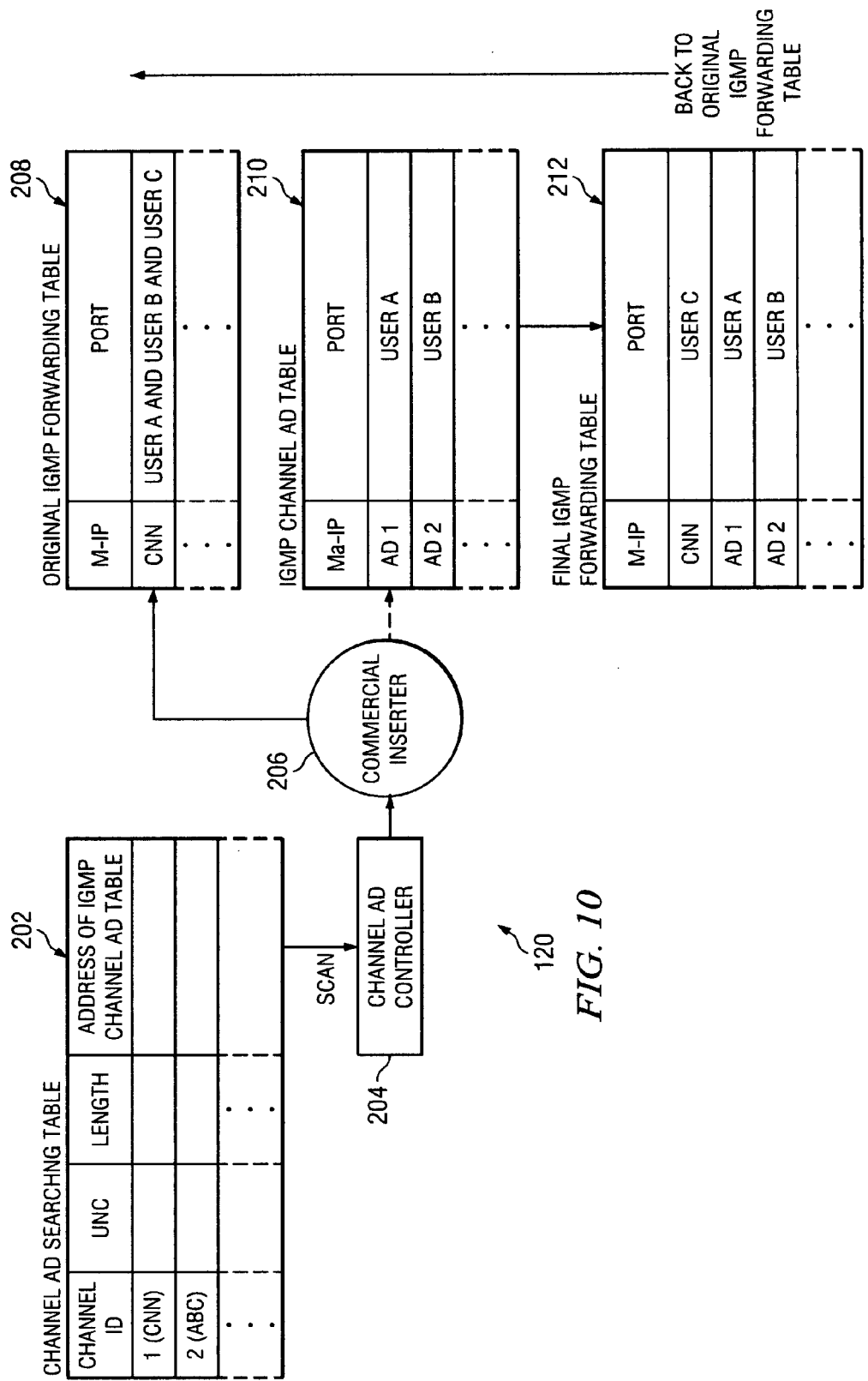
FIG. 10 illustrates an exemplary network node for dynamically inserting commercials into television programs to provide customized television programs to television subscribers, in accordance with embodiments of the present invention.

Referring now to FIG. 10, there is illustrated an exemplary network node operating as a merge node 120 to dynamically insert commercials into television programs to provide customized television programs to television subscribers, in accordance with embodiments of the present invention. The merge node 120 includes a channel ad searching table 202, a channel ad controller 204, a commercial inserter 206 and various IGMP forwarding tables 208, 210 and 212. It is assumed in FIG. 10 that the merge node 120 is within the multicast trees for one or more television programs and one or more commercials. Specifically, as shown in FIG. 10, the merge node 120 is coupled to receive the television program "CNN" and commercials "Ad 1" and "Ad 2."

An original IGMP forwarding table 208 shows that three television subscribers, Users A, B, and C, are watching (subscribed to or tuned in to) the television program, CNN. In accordance with embodiments of the present invention, an IGMP Channel AD table 210 is also included to designate/specify which commercial to provide to each specific user or user group. The IGMP Channel AD table 210 can be statically configured by operator/administrator, as described above in connection with FIG. 3, or dynamically configured by the channel ad controller 204, as described above in connection with FIGS. 4-9.

Based on the Original IGMP Forwarding Table 208 and the IGMP Channel Ad Table 210, the channel ad controller 204 operates to identify one or more subscribers to a particular multicast television program and to identify a targeted commercial program for one or more of the subscribers. As shown in FIG. 10, User A is to receive Ad 1, User B is to receive Ad 2 and User C is to receive whatever ad is within the original television program stream (i.e., non-targeted). In addition, the channel ad controller 204 operates to modify the original IGMP forwarding table 208 by merging the original IGMP forwarding table 208 with the IGMP channel Ad table 210 to produce the final IGMP forwarding table 212.

The commercial inserter 206 is coupled to receive a main television program and one or more commercial programs, and based on instructions from the channel ad controller 204, the commercial inserter 206 operates to produce customized program streams for each user. For example, the commercial inserter 206 inserts Ad 1 into the program stream for User A, inserts Ad 2 into the program stream for User B and preserves the original program stream (i.e., makes no changes) for User C.

Then, based on the relationship between the multicast group address and the user port provided by the final IGMP forwarding table 212, the forwarding engine (not specifically shown) will forward the correct streams to each user, namely Ad1 for User A, Ad2 for User B and the commercial in the original main stream to User C. After the appropriate commercials have been forwarded to the appropriate users, the channel ad controller 204 re-activates the original IGMP forwarding table 208, so that Users A, B and C will all receive the main television program again. Therefore, during the commercial merge process, the channel ad controller 204 acts like IGMP Join/Leave to manage the forwarding table when a commercial packet comes in, but with no IGMP messages, only internal FIB database operation.

The Channel Ad searching table 202 operates to accommodate the scenario that one or more IPTV main stream channels carry channel-specific customized commercials for different users (e.g., the television program includes one or more commercial schedules for different television subscribers, as shown in FIG. 6). The Channel Ad Controller 204 scans the Channel Ad searching table 202 periodically to obtain the address of the previously described IGMP Channel Ad table 210 for a particular channel, and instructs the commercial inserter 206 to insert the appropriate commercials for each user, and builds a new IGMP forwarding table during commercial times for that particular channel, as also described above.

Figure 11:
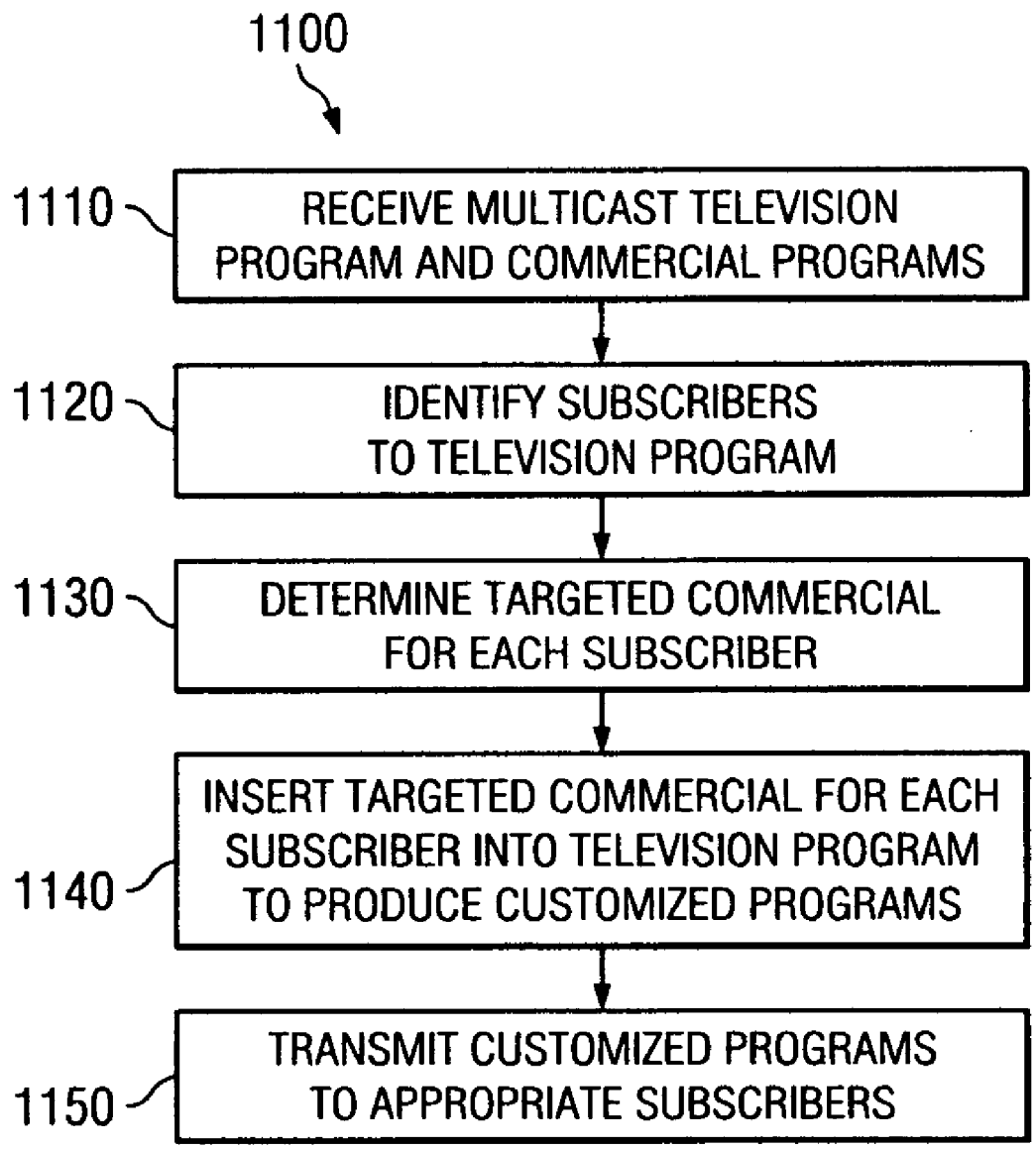
FIG. 11 is a flowchart illustrating an exemplary process for dynamically inserting commercials into television programs to produce customized programs for television subscribers, in accordance with embodiments of the present invention.

FIG. 11 is a flowchart illustrating an exemplary process 1100 for dynamically inserting commercials into television programs to produce customized programs for television subscribers, in accordance with embodiments of the present invention. Initially, at block 1110, a multicast television program and one or more commercial programs are received via a packet-switched network. At block 1120, one or more subscribers to the multicast television program are identified, and at block 1130, a targeted commercial program for each subscriber is determined. At block 1140, the targeted commercial program is inserted into the multicast television program for each of the subscribers to produce respective customized programs, and at block 1150, the customized programs are transmitted over the packet-switched network to the appropriate subscribers.

Figure 12A:
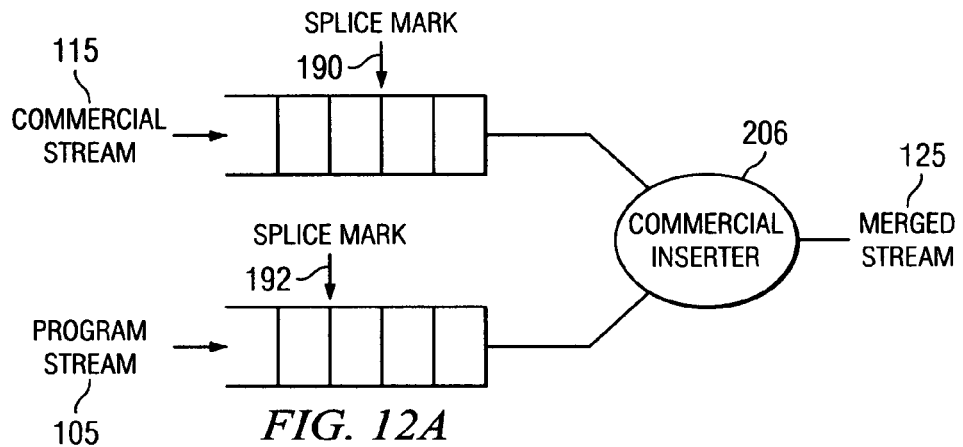
FIGS. 12A-12C illustrate an exemplary operation of network merge node for dynamically inserting a commercial into a television program using splice marks, in accordance with embodiments of the present invention.
Figure 12B:
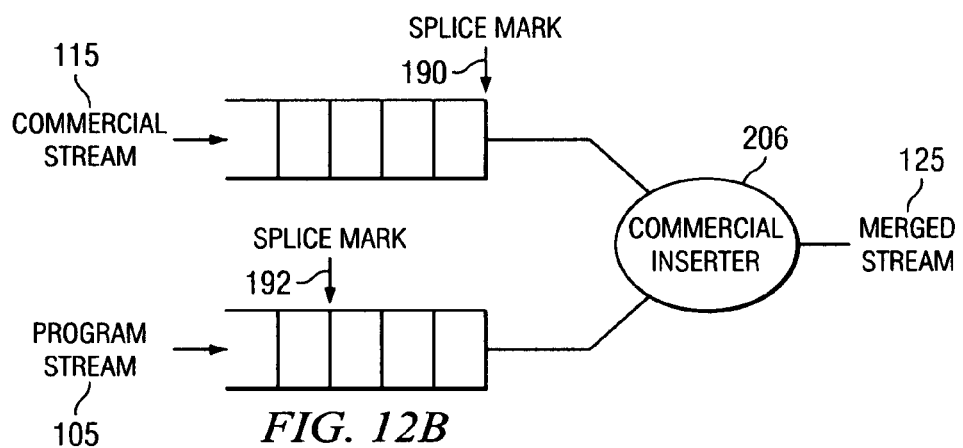
Figure 12C:
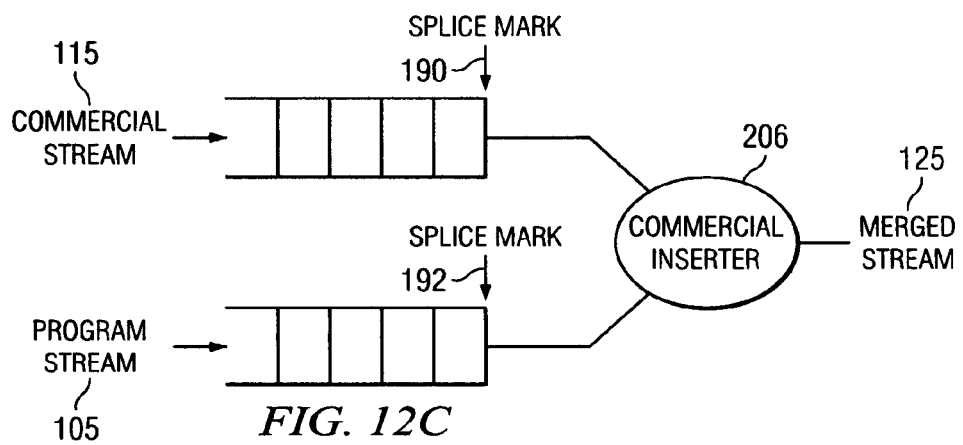

Referring now to FIGS. 12A-12C, for commercial insertion to work, in general, two audio/video streams need to be spliced together without creating a visible defect. Traditional commercial inserters manipulate the audio/video streams at the application layer. However, application layer manipulation is complex and expensive, since the data streams are in compressed format Therefore, the commercial inserter 206 of the present invention operates to splice together two audio/video streams at the network layer or below. The compressed packet audio/video streams of the main program and commercials are each formatted to enable easy switching between the two audio/video streams without creating a visible defect by designating specific points in the streams at which switching can take place. These points are referred to herein as "splice marks" 190 and 192.

A splice mark point 190 and 192 is an indicator of a boundary between two packets. There are two kinds of splice mark points, splice-in marks and splice-out marks. A splice-out mark indicates that the frame previous to the splice mark point is the last frame to be displayed before a splice. A splice-in mark indicates that the frame after the splice mark point is the first frame to be displayed after a splice. The presence of a splice mark point in a packet stream is not a signal that there must be a splice. It is only an indicator that it is possible to make a splice at this point.

The splice mark points are carried at the network layer or below to make it easy for layer 2 or layer 3 routers to know where to switch between two streams. In addition, by carrying the splice mark points at the network layer, the bridge, switch, or router does not have to do deep-packet inspection. Deep-packet inspection consumes resources in the routing engine and violates layer modularity, which makes network hardware and software more difficult to build and harder to maintain.

In an exemplary embodiment, to insert a splice mark into the network layer of an audio/visual stream, the encoding codec first determines where the splice mark points can be placed in the audio/video stream without causing visible defects and then instructs the network layer to include splice mark indicators in the packet stream to indicate where those splice mark points are located. Since the encoding codec is at the application layer of the protocol stack on the source node, and splice marks are in layer 2 or 3, an Application Program Interface (API) between the codec and layer 2 or 3 is provided to pass an insert splice mark indication message down from the application layer to layer 2 or 3. This indication message may be passed directly from the application layer to layer 2 or 3 or it may be relayed using multiple API's by the layers in between.

Referring again to FIGS. 12A-12C, there is illustrated two packet queues and a commercial inserter 206 that can choose a packet from either queue and send it to an output port. The queues receive packets from two multicast streams. One multicast stream contains a broadcast television program 105 and the other stream contains a commercial 115. Each stream contains a respective splice mark point 190 and 192. To splice in a commercial into the television program, as shown in FIG. 12B the commercial inserter 206 first discards all packets in the commercial queue until the first packet after the commercial splice mark 190 is at the head of the commercial queue. The commercial inserter 206 then removes packets from the program queue and forwards them to the output port in the normal manner until it removes the last packet before the program splice mark 192. Thereafter, as shown in FIG. 12C, the commercial inserter 206 begins removing packets from the commercial queue in the normal manner and forwards them to the output port until the end of the commercial stream or an end splice mark point (not shown) in the commercial stream is reached to form a merged stream 125.

Figure 13:
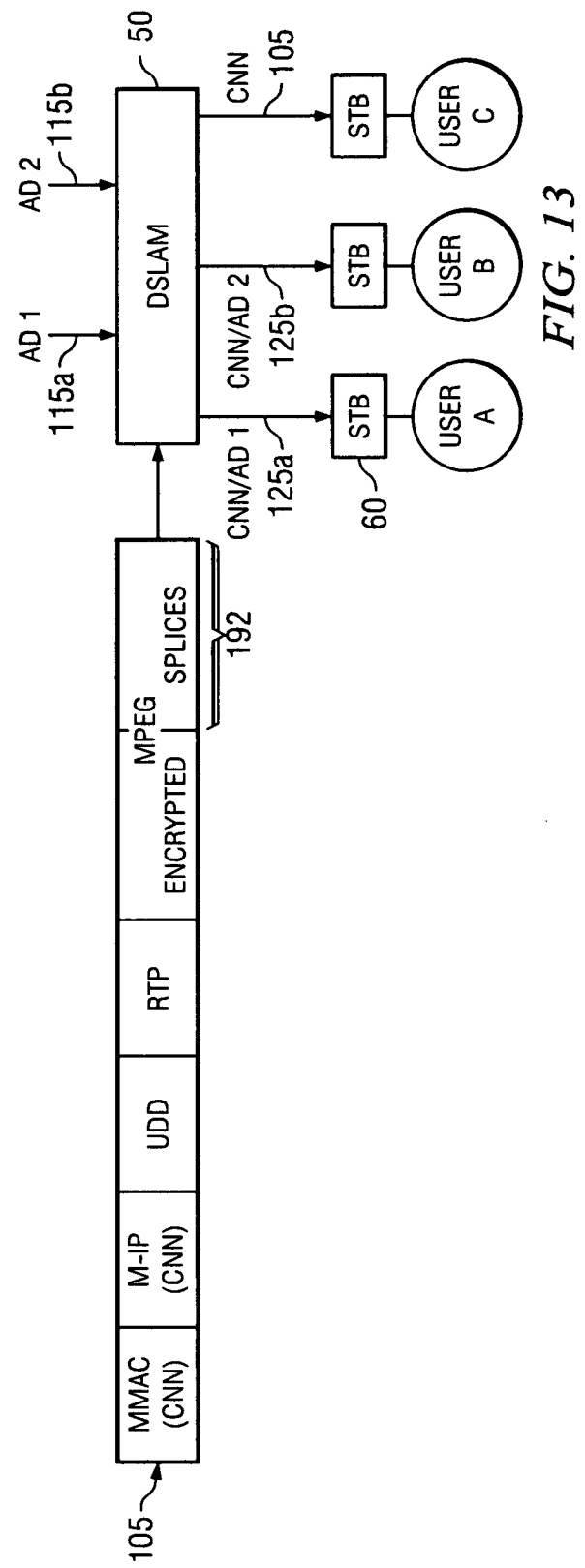
FIG. 13 illustrates an exemplary DSLAM network node for dynamically inserting commercials into a television program based on splice marks to provide different commercials to different subscribers, in accordance with embodiments of the present invention.

Using the example described above in connection with FIG. 10, and referring now to FIG. 13, when a merge node, here the DSLAM 50, reaches a program splice mark point 192 in a program stream 105, the DSLAM inserts the appropriate commercial 115*a* or 115*b* into the stream for each of one or more subscribers (users) and forwards the correct stream to each user. For example, as shown in FIG. 13, Ad1 115*a* is forwarded to the STB 60 for User A, Ad2 115*b* is forwarded to the STB 60 for User B and the commercial in the original program stream 105 is forwarded to the STB 60 for User C. Upon reaching an end splice mark point in the commercial stream for Users A and B, the DSLAM 50 begins forwarding the original program stream 105 again to Users A and B.

Figure 14:
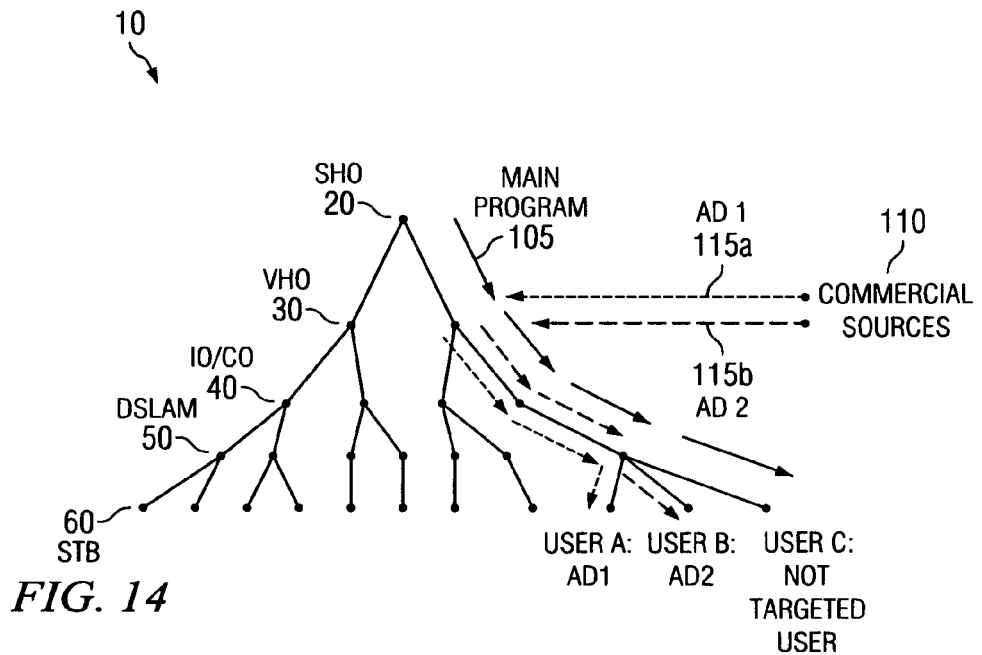
FIG. 14 illustrates an exemplary IPTV architecture for providing different commercials to different subscribers using the DSLAM example shown in FIG. 13, in accordance with embodiments of the present invention.

Continuing with the same example, as shown in FIG. 14, in an exemplary IPTV architecture, the main television program 105 sourced from the SHO 20 and one or more local/targeted commercials 115*a* and 115*b* originated from one or more commercial sources 110 sourced from the VHO 30 are multicast downstream toward the DSLAM 50. The commercials 115*a* and 115*b* are inserted at the DSLAM 50 to achieve maximum flexibility and to ensure that the STB 60 associated with User A receives Ad1 115*a*, the STB 60 associated with User B receives Ad2 115*b*, and the STB 60 associated with User C receives the ad in the original main stream (non-targeted) 105 from the SHO 20.

Figure 15A:
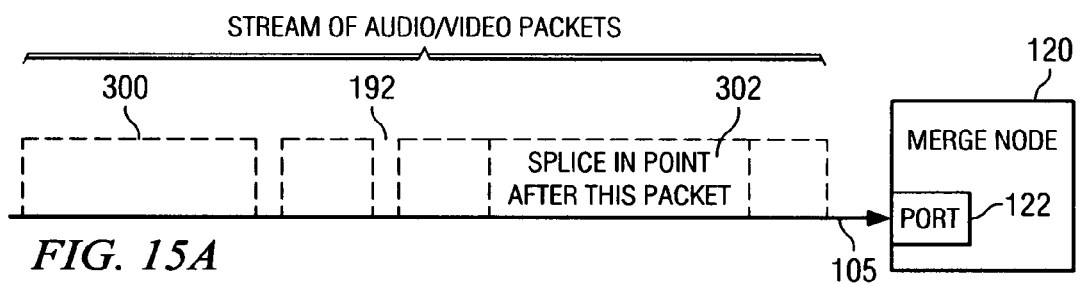
FIGS. 15A and 15B illustrate exemplary embodiments for indicating the location a splice mark in a television program stream, in accordance with embodiments of the present invention.
Figure 15B:
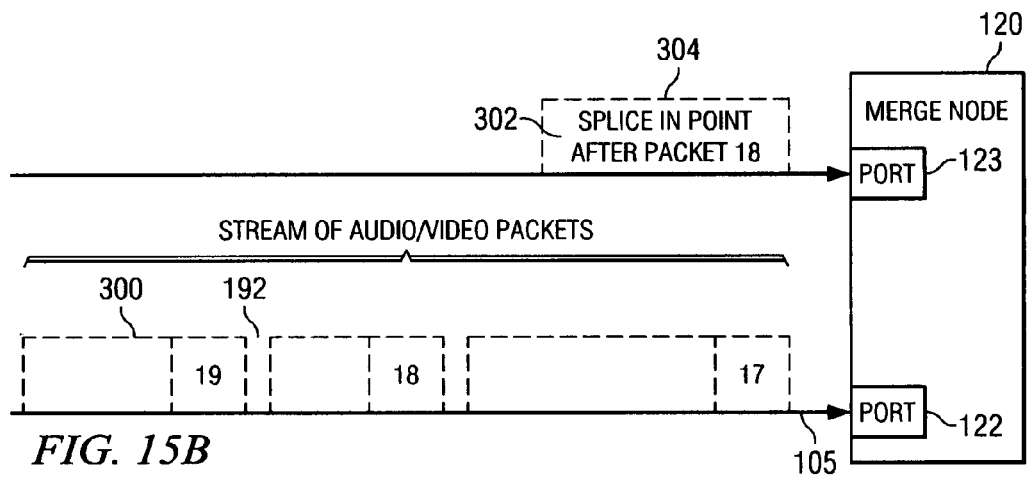

Turning now to FIGS. 15A and 15B, a splice mark indicator 302 indicating where a splice mark point 192 occurs in a stream of audio/video packets 300 can be carried either in-band with the audio/video stream and received at the same input port 122 at the merge node 120, as shown in FIG. 15A or out-of-band within another stream of packets 304 and received at another input port 123 of the merge node 120, as shown in FIG. 15B. If a splice mark indicator 302 is in-band, as shown in FIG. 15A, it can be located immediately adjacent to the splice point or it can be placed in a packet 300 that is many packets previous to the splice point. In addition, the splice mark indicator 302 can also be in-band, but in a separate packet that is not an audio/video packet. If a splice mark indicator 302 is out-of-band, as shown in FIG. 15B, the packets in the audio/video stream 300 should have identifiers, such as RTP sequence numbers, and the out-of-band splice mark indicator 302 should have a reference to a particular packet identifier immediately prior to or immediately after the splice mark point 192.

It should be noted that there are several ways to add splice mark indicators 302 to existing layer 2 or 3 protocols. One way is to modify a layer 2 or 3 protocol to contain an additional field. Another way is to add a new protocol layer above layer 2 or 3 or a new sub-layer in layer 2 or 3 that encapsulates the existing layer 2 or 3 packet, but does not change any fields in the existing packet. This new encapsulation contains the splice mark indicator 302. However, the present invention is not limited to any particular mechanism for providing splice mark indicators 302.

Figure 16:
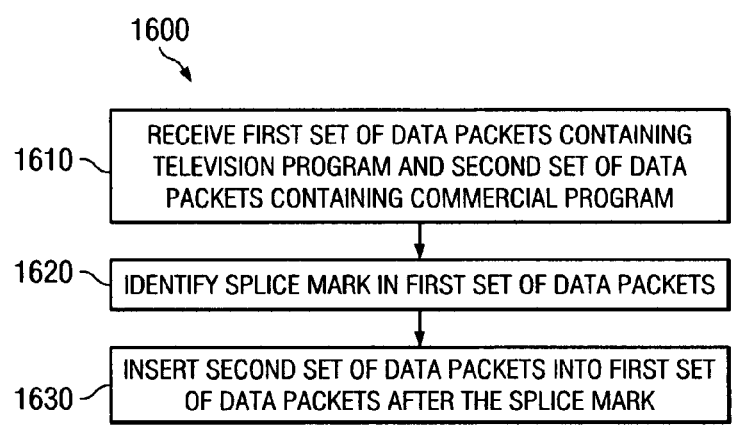
FIG. 16 is a flowchart illustrating an exemplary process for dynamically inserting a commercial into a television program using splice marks, in accordance with embodiments of the present invention.

FIG. 16 is a flowchart illustrating an exemplary process 1600 for dynamically inserting a commercial into a television program using splice marks, in accordance with embodiments of the present invention. Initially, at block 1610, a first set of data packets containing a television program and a second set of data packets containing a commercial program are received. At block 1620, a splice mark point is identified in the first set of data packets, and at block 1630, the second set of data packets containing the commercial program are inserted into the first set of data packets containing the television program after the splice mark point. In an exemplary embodiment, the commercial insertion at block 1630 is performed within the layer 2 or layer 3 protocol stack.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A network node within a packet-switched network, comprising:
   a program input port coupled to receive a multicast television program;
   a commercial input port coupled to receive commercial programs;
   a controller that operates to identify one or more subscribers to said multicast television program and to identify a targeted one of said commercial programs for each of said subscribers;
   a commercial inserter operating to insert said respective targeted commercial program for each of said subscribers into said multicast television program to produce respective customized programs; and
   a subscriber output port coupled to transmit said customized programs towards said respective subscribers;
   wherein said controller is further operable to receive a program splice mark indicator within a multicast layer 2 or layer 3 protocol stack carrying said multicast television program, said program splice mark indicator identifying a program splice mark point between two of said program packets within said program queue, said commercial inserter inserting said respective targeted commercial program for each of said subscribers between said two program packets.

2. The network node of claim 1, further comprising:
   a subscriber input port coupled to receive a subscribe message from a subscribing one of said subscribers; and
   wherein said controller operates to determine from said subscribe message a program source address identifying a program source of said multicast television program to which said subscribing one of said subscribers is subscribing and a commercial source address identifying a commercial source of one of said commercial programs to insert into said multicast television program to produce said customized program for said subscribing one of said subscribers.

3. The network node of claim 2, wherein said controller further operates to generate from said subscribe message a television program subscribe message addressed to said program source by said program source address and a commercial program subscribe message addressed to said commercial source by said commercial source address; and further comprising:
a program output port coupled to transmit said program subscribe message towards said program source; and
a commercial output port coupled to transmit said commercial subscribe message towards said commercial source.

4. The network node of claim 3, wherein said subscribe message includes a combined address that identifies said program source address and said commercial source address; and further comprising:
a table mapping said combined address to said program source address and said commercial source address.

5. The network node of claim 3, wherein said subscribe message is sent within a packet containing said program source address that is encapsulated in a different layer packet containing said commercial source address.

6. The network node of claim 3, wherein said subscribe message includes said program source address and said commercial source address.

7. The network node of claim 6, wherein said subscribe message is a modified subscribe message modified by an address modification node to include said commercial source address.

8. The network node of claim 2, further comprising:
a schedule input port coupled to receive a commercial schedule including a multicast stream of commercials for insertion into a respective one of said customized programs associated with said subscribing one of said subscribers; and wherein said controller operates to determine a current timing parameter associated with said multicast television program and access said commercial schedule to identify a current commercial from said multicast stream of commercials associated with said current timing parameter; and wherein said commercial inserter operates to insert said current commercial into said respective one of said customized programs associated with said subscribing one of said subscribers.

9. The network node of claim 8, wherein said schedule input port is coupled to receive said commercial schedule from one of said commercial source and said program source.

10. The network node of claim 8, wherein said subscribe message further includes a commercial schedule identifier identifying said commercial schedule and said controller uses said commercial schedule identifier to retrieve said commercial schedule.

11. The network node of claim 10, wherein said controller operates to retrieve said commercial schedule from a database of commercial schedules using said commercial schedule identifier.

12. The network node of claim 8, wherein said subscribe message further includes a demographic identifier associated with said subscribing one of said subscribers and said controller uses said demographic identifier to retrieve said commercial schedule.

13. The network node of claim 12, wherein said controller operates to retrieve said commercial schedule from a commercial policy server using said demographic identifier.

14. The network node of claim 1, wherein said network node is a DSLAM at an end office coupled to said subscribing one of said subscribers.

15. The network node of claim 1, wherein said network node is dynamically selected from intermediate nodes between a program source node multicasting said television program and a Set-Top Box associated with said subscribing one of said subscribers.

16. The network node of claim 1, further comprising:
a television queue containing a stream of program packets forming said multicast television program; and
a commercial queue containing a stream of commercial packets forming a selected one of said commercial programs;
wherein said commercial inserter operates to select either a next one of said program packets from said television queue or a next one of said commercial packets from said commercial queue for insertion into one of said customized programs.

17. The network node of claim 16, wherein:
said commercial inserter operates to select next ones of said program packets from said program queue for insertion into said one of said customized programs until said program splice mark point is reached; and
said commercial inserter operates to select ones of said commercial packets from said commercial queue for insertion into said one of said customized programs after said program splice mark point is reached.

18. The network node of claim 17, wherein:
said controller is further operable to receive a commercial splice mark indicator within a multicast layer 2 or layer 3 protocol stack carrying said one of said commercial programs, said commercial splice mark indicator identifying a commercial splice mark point between two of said commercial packets within said commercial queue; and
said commercial inserter operates to discard next ones of said commercial packets from said commercial queue until said commercial splice mark point is reached.

19. The network node of claim 18, wherein said program splice mark indicator and said commercial splice mark indicator are received either in-band or out-of-band.

20. A method for dynamically inserting commercials into multicast television programs to produce customized programs for television subscribers, comprising the steps of:
receiving a multicast television program and one or more commercial programs via a packet-switched network;
identifying one or more subscribers to said multicast television program;
determining a targeted one of said commercial programs for each of said subscribers;
receive a program splice mark indicator within a multicast layer 2 or layer 3 protocol stack carrying said multicast television program, said program splice mark indicator identifying a program splice mark point between two of said program packets within said program queue;
inserting said respective targeted commercial program for each of said subscribers into said multicast television program between said two program packets to produce respective customized programs; and
transmitting each of said customized programs over said packet-switched network towards said respective subscribers.

21. The method of claim 20, further comprising the steps of:
receiving a subscribe message from a subscribing one of said subscribers; and
determining from said subscribe message a program source address identifying a program source of said multicast television program to which said subscribing one of said subscribers is subscribing and a commercial source address identifying a commercial source of one of said commercial programs to insert into said multicast television program to produce said customized program for said subscribing one of said subscribers.

22. The method of claim 21, further comprising the steps of:
- generating from said subscribe message a television program subscribe message addressed to said program source by said program source address and a commercial program subscribe message addressed to said commercial source by said commercial source address;
- transmitting said program subscribe message to said program source; and
- transmitting said commercial subscribe message to said commercial source.

23. The method of claim 22, wherein said step of generating said television program subscribe message and said commercial program subscribe message further comprises the steps of:
- retrieving a combined address that identifies said program source address and said commercial source address from said subscribe message; and
- accessing a table mapping said combined address to said program source address and said commercial source address.

24. The method of claim 22, wherein said step of generating said television program subscribe message and said commercial program subscribe message further comprises the step of:
- decapsulating an outer layer packet containing said commercial source address to retrieve another packet containing said subscribe message with said program source address.

25. The method of claim 21, further comprising the steps of:
- receiving a commercial schedule including a multicast stream of commercials for insertion into a respective one of said customized programs associated with said subscribing one of said subscribers;
- determining a current timing parameter associated with said multicast television program;
- accessing said commercial schedule to identify a current commercial from said multicast stream of commercials associated with said current timing parameter; and
- inserting said current commercial into said respective one of said customized programs associated with said subscribing one of said subscribers.

26. The method of claim 25, wherein said step of receiving said subscribe message further includes the step of:
- receiving said subscribe message including a commercial schedule identifier identifying said commercial schedule for use in retrieving said commercial schedule associated with said commercial schedule identifier.

27. The method of claim 25, wherein said step of receiving said subscribe message further includes the step of:
- receiving said subscribe message including a demographic identifier associated with said subscribing one of said subscribers for use in retrieving said commercial schedule associated with said demographic identifier.

28. The method of claim 20, wherein said step of inserting further comprises the steps of:
- maintaining a television queue containing a stream of program packets forming said multicast television program;
- maintaining a commercial queue containing a stream of commercial packets forming a selected one of said commercial programs; and
- selecting either a next one of said program packets from said television queue or a next one of said commercial packets from said commercial queue for insertion into one of said customized programs.

29. The method of claim 28, wherein said step of selecting further comprises the steps of:
- receiving a commercial splice mark indicator within a multicast layer 2 or layer 3 protocol stack carrying said commercial packets of said one of said commercial programs, said commercial splice mark indicator identifying a commercial splice mark point between two of said commercial packets within said commercial queue;
- discarding next ones of said commercial packets from said commercial queue until said commercial splice mark point is reached;
- selecting next ones of said program packets from said program queue for insertion into said one of said customized programs until said program splice mark point is reached; and
- selecting ones of said commercial packets after said commercial splice mark point from said commercial queue for insertion into said one of said customized programs after said program splice mark point is reached.

30. The method of claim 29, wherein said step of receiving said program splice mark indicator further comprises the step of:
- receiving said program splice mark indicator in-band with said multicast television program.

31. The method of claim 30, wherein said step of receiving said program splice mark indicator further comprises the step of:
- receiving said program splice mark indicator within a program packet immediately adjacent to said program splice mark point within said program packets.

32. The method of claim 30, wherein said step of receiving said program splice mark indicator further comprises the step of:
- receiving said program splice mark indicator within a program packet prior to said program splice mark point within said program packets.

33. The method of claim 30, wherein each of said program packets are audio/visual packets; and wherein said step of receiving said program splice mark indicator further comprises the step of:
- receiving said program splice mark indicator within a non-audio/visual packet that is in-band with said program packets.

34. The method of claim 29, wherein each of said program packets includes a packet identifier; and wherein said step of receiving said program splice mark indicator further comprises the step of:
- receiving said program splice mark indicator out-of-band from said multicast television program, said program splice mark indicator including said packet identifier of said program packet adjacent to said program splice mark point.

35. The method of claim 29, wherein said step of receiving said program splice mark indicator further comprises the step of:
- receiving said program splice mark indicator within a protocol sub-layer of layer 2 or layer 3 that encapsulates said program packets.

36. The method of claim 29, further comprising the step of:
- placing said program splice mark indicator within said multicast layer 2 or layer 3 protocol stack via an application program interface between an application layer associated with an encoding codec and layer 2 or layer 3.

37. The method of claim 29, further comprising the step of:
- placing said program splice mark indicator within said multicast layer 2 or layer 3 protocol stack via multiple application program interfaces between an application layer associated with an encoding codec and layer 2 or layer 3.

* * * * *